Sept. 14, 1954     E. M. GREER ET AL     2,688,981
VALVE
Filed Sept. 2, 1948                                    2 Sheets-Sheet 1
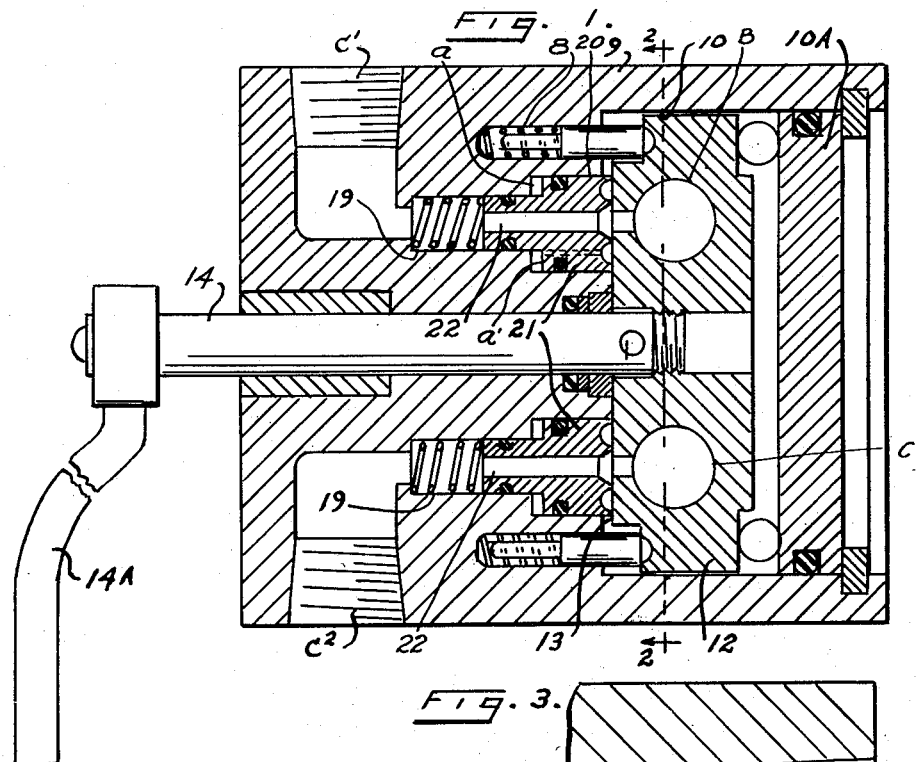
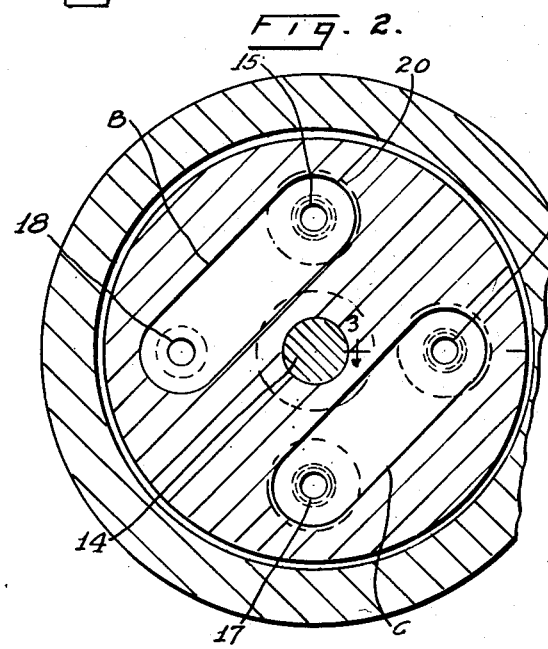
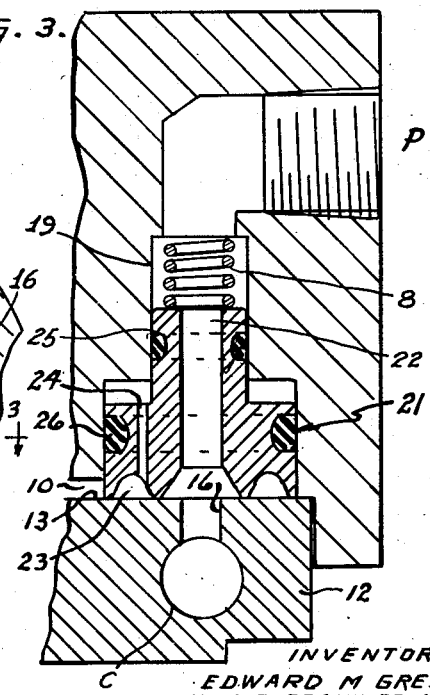
INVENTORS
EDWARD M GREER
THOMAS FRANK COMER
BY Howard T. Jeandron
ATTORNEY

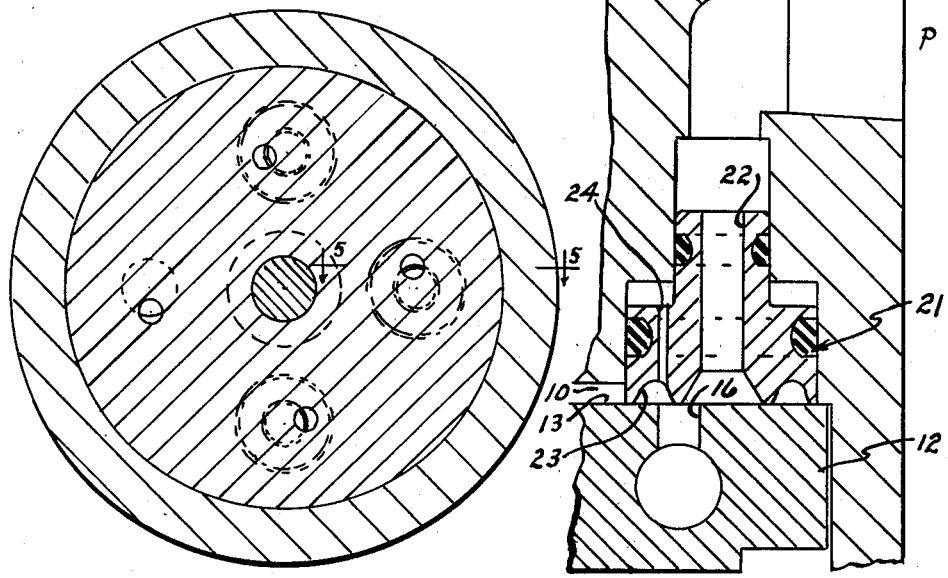
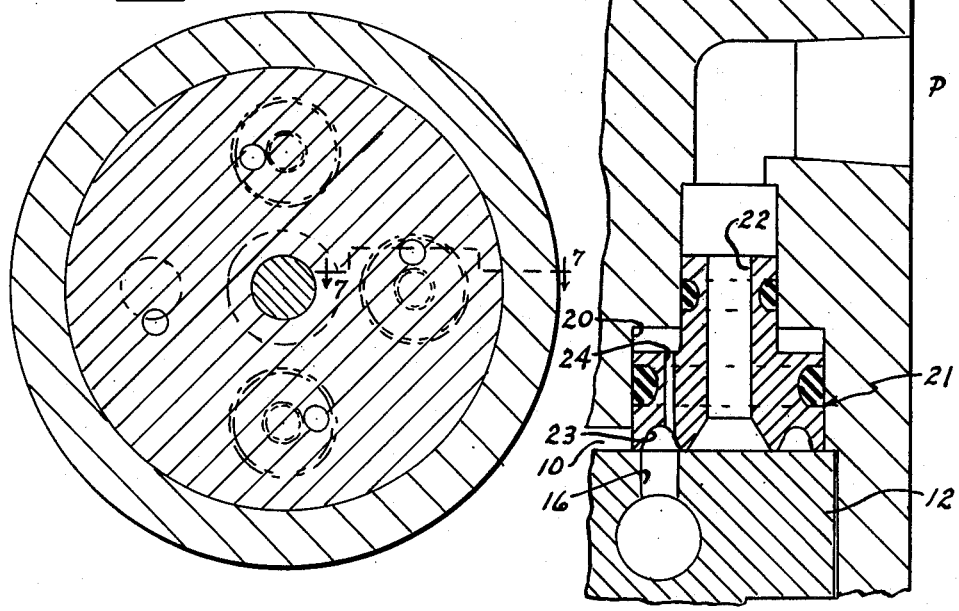

Patented Sept. 14, 1954

2,688,981

UNITED STATES PATENT OFFICE 2,688,981

VALVE

Edward M. Greer, West Hempstead, and Thomas Frank Comer, Farmingdale, N. Y., assignors to Greer Hydraulics, Inc., Brooklyn, N. Y.

Application September 2, 1948, Serial No. 47,454

2 Claims. (Cl. 137—625.43)

1

This invention relates to selector valves and more particularly to a four way rotary selector valve.

Rotary valves have certain advantages over the slide type valve and various types of lever operated poppet valves. With a rotary valve, there is no need to balance and eliminate the handle load that is common with the other type valves. However one of the disadvantages found with rotary valves is the inability to properly seal the rotary ports during the rotation of the valve in selecting the pressure or return port for operation. Due to the manner of rotating the ports into and out of alignment in a rotary valve, this valve is commonly referred to as a rotary double shear seal valve. Although various types of seals have been utilized that perform fairly well and provide a sealing action when the ports are in alignment, there is considerable leakage if the rotary valve is not fully operated to an aligned position that is where the ports are in perfect alignment.

An object of this invention is to provide a rotary selector valve in which a plurality of shear seal plungers are provided to maintain a positive balanced seal.

A further object of this invention is to provide a rotary selector valve in which a plurality of plungers are provided each having an enlarged end face and to utilize the hydraulic forces in the valve in maintaining a balanced shear seal.

A still further object of this invention is to provide a compact rugged easily assembled rotary selector valve which provides a maximum of 90° of movement from one operative position to the other and provides a non-interflow balanced shear seal in any intermediate position.

A still further object of this invention is to provide a valve by which fluid flow may be controlled through the partial overlapping of the rotary valve plate and double shear seal plungers.

Further objects of this invention may be apparent by reference to the accompanying detailed description and the drawings in which Fig. 1 is a side elevational view partly in cross section of a rotary selector valve.

Fig. 2 is a cross sectional view taken on line 2—2 of Fig. 1,

Fig. 3 is a cross sectional view of a single communicating port taken on line 3—3 of Fig. 2.

Fig. 4 is a cross sectional view similar to Fig. 2 but illustrating the valve in a rotated position, Fig. 5 is a cross sectional view of the shear seal taken on line 5—5 of Fig. 4, Fig. 6 is a cross sectional view similar to Fig. 2 with the valve rotated still further, and Fig. 7 is a cross sectional view of a shear seal taken on line 7—7 of Fig. 6.

Referring to the drawings and particularly Fig. 1, the valve comprises a main body portion 9 in which there is formed a large cylinder chamber 10. The main body portion 9 is provided with four ports i. e. control ports C1 and C2 (for connection to a cylinder) and ports R (return) (not shown) and P (pressure). In communication at one end with each of the ports are four concentrically spaced bores of small diameter as at 19 at the end adjacent the ports and of enlarged diameter as at 20 at the end adjacent to and in communication with the chamber 10, said enlarged diameter portion of each bore defining an annular shoulder $a$. Three plungers 21 each of enlarged diameter at one end defining an annular shoulder $a'$ are slidably mounted in the bores with the smaller portion of the plunger fitting snugly yet slidably in the bore portion 19 and with the larger portion of the plunger fitting snugly yet slidably in the bore portion 20. A spring 8 is provided in each bore 19 to normally press the plunger 21 against the face of a rotor 12. The bore 20 that is connected to the return port will not be provided with a plunger. The rotor 12 is rotatably mounted in the chamber 10 having a face 13 abutting against the ends of the plungers 21. The rotor 12 is provided with a shaft 14 connected to an operating handle 14A. The rotor 12 is provided with four concentrically spaced ports 15, 16, 17, and 18 that in one position will be aligned with the central axis of the plungers 21 and their associated bores. Consequently, the 90° rotation of the rotor 12 will permit the ports 15, 16, 17 and 18 to be moved from their alignment with one plunger to a similar alignment with the next plunger for the other position of the valve. The rotor 12 has internal passageways B and C positioned so that ports 15 and 18 are interconnected while ports 17 and 16 will be interconnected. The end of chamber 10 may be provided with a seal and enclosing plate 10A (as illustrated in Fig. 1). A seal may be mounted about the shaft 14 to prevent any leakage past the shaft.

Referring to Fig. 3 a cross sectional view of the plunger 21 is illustrated. The plunger 21 is provided with a central bore portion 22 which normally connects the bore 19 with the chamber 10. The wide face of the plunger 21 is provided with an annular groove 23. A communicating passage or bore 24 is provided to connect the annular groove 23 with the bore portion 20. A pair of seals 25 and 26 are provided in associated annular grooves in the periphery of each of the portions of the plunger to prevent leakage past the plunger 21 during the operation of the valve.

The operation of the shear seal valve may be followed by reference to Figs. 2 through 7 inclusive. Referring to Figs. 2 and 3, the valve is illustrated in one operative position with the pressure or inlet port P communicating through the central bore 22 of the plunger 21 through the port 16 of the rotor 12 to a communicating passage C within the rotor connected to the port 17 and thus the fluid pressure will pass through a similar plunger 21 (Fig. 1) aligned with port 17 through the bore portion 19 and out a communicating port C2 to a cylinder to be operated (not shown). With the valve in this position, the opposite cylinder port C1 will be similarly connected to port 15 of the rotor to a communicating passage B within the rotor connected to the return port R (Fig. 2). Referring to Fig. 3, it is apparent that any fluid leaking past the face of the plunger 21 will be trapped in the annular groove 23 and might leak further into the chamber 10. This fluid would of course pass to the open return port. It is to be noted that any fluid entrapped in the annular groove 23 will pass through the communicating passage 24 to the bore portion 20 and due to the seals 25 and 26, it will be trapped in back of the larger area of the plunger. Thus, it is apparent that the fluid pressure will act on the complete area of plunger 21 to force the plunger 21 toward the rotor 12. The fluid will also act in an opposite direction against the plunger in the port 16 and the annular groove 23, but the greater area being on the opposite side of the valve, permits a pressure seal of the plunger against the face 13 of the rotor 12.

Referring to Figs. 4 and 5, it is apparent that a slight rotary movement of the selector valve will carry port 16 out of alignment with the bore 22 of the plunger 21 and the fluid pressure normally passing through bore 22 into port 16 will likewise pass into the annular groove 23 through the communicating passage 24 to the bore 20 thus providing a balanced plunger or slightly biased towards the face 13 of the rotor 12. In this position the ordinary single bore plunger would provide leakage completely dumping the fluid pressure to a return line but as illustrated in this invention, the fluid pressure is entrapped and utilized to assist the plunger in maintaining a sealed position.

Referring to Figs. 6 and 7 in which the rotor 12 has been rotated still further so that the port 16 of the rotor 12 is in alignment with the annular groove 23, it is apparent that the fluid pressure from port P passing through the bore 22 of the plunger 21 is completely cut off and the fluid pressure that was entrapped in bore portion 20 in back of the wide portion of the plunger 21 may likewise be dumped through the communicating passage 24 into the annular groove through the port 16 and so on to the cylinder. However, if the back pressure remains, the fluid pressure will be retained in the bore portion 20 maintaining a perfect seal as illustrated in Fig. 7. Of course further rotative movement of the rotor 12 simply carries the ports out of alignment and the pressure port and cylinder ports remain in a sealed position with no means of communicating with each other until the rotor has been moved 90° to bring the ports 15, 16, 17 and 18 into axial alignment with the plungers 21 and the return port. It is to be noted that any leakage that may occur during the shear movement of the rotor 12 with the plungers 21 will pass into the chamber 10 that is connected to the open return port. Thus it is apparent that a rotor selector valve incorporating plungers as illustrated in Figs. 3, 5 and 7 will provide a positive sealing action not only in the aligned operating position but in any slight offset position as described and will not permit dumping or excessive leakage at any intermediate position as is normally found with the average rotary selector valve.

Various changes in the design or construction of the valve may be made without departing from the spirit of this invention and this invention shall be limited only by the appended claims.

What is claimed is:

1. A selector valve comprising a body portion having a cylindrical chamber therein, a rotor rotatably mounted in said cylindrical chamber, means to prevent axial movement of said rotor in said chamber, said body portion having a pair of control ports and an inlet and outlet port leading therein, a plurality of bores in said body portion in communication respectively at one end with said ports, said bores extending parallel to the axis of said rotor and being in communication at their other ends with said cylindrical chamber, a plunger slidably mounted in each of at least three of said bores, each of said plungers having a central bore therethrough and having its end faces of different areas, the smaller area end of the plungers being associated with said ports respectively and the larger area end of the plungers being associated with the rotor and being resiliently retained against a face thereof, each of said bores in said body portion being of enlarged diameter at the end adjacent said rotor defining an annular shoulder, each of said plungers also being of enlarged diameter at the end adjacent said rotor also defining an annular shoulder, said small and large diameter portions of each of said plungers fitting snugly yet slidably in the corresponding portions of said bore, the central bore in each plunger extending through the outer end of the enlarged portion thereof, said outer end of the plunger having an annular groove encompassing the central bore and having a bore leading from said annular groove through the annular shoulder in said plunger, said rotor having four ports leading thereinto through said face, adapted to be aligned with the bores in said body portion and having a pair of passageways therein providing communication between pairs of said ports, means to rotate the rotor to two positions, one of said positions providing communication from said inlet port through one of said passageways to one of the control ports with the outlet port being connected through the other passageway to the other control port and the other position providing communication from said inlet port through the first named passageway and the second named control port with the outlet port being connected through the second named passageway and the first named control port.

2. The combination set forth in claim 1 in which the small and large portion of the plunger each has an annular groove in the periphery thereof and a resilient sealing member is positioned in each annular groove.

References Cited in the file of this patent

UNITED STATES PATENTS

| Number | Name | Date |
|--------|------|------|
| 1,650,151 | Patterson | Nov. 22, 1927 |
| 1,809,432 | Webb | June 9, 1931 |
| 1,971,187 | Jacobsen | Aug. 21, 1934 |
| 2,455,087 | Parker | Nov. 30, 1948 |
| 2,519,574 | Holl | Aug. 22, 1950 |